US012652202B2

(12) United States Patent
Liu

(10) Patent No.: US 12,652,202 B2
(45) Date of Patent: Jun. 9, 2026

(54) REDRIVER AND OPERATION METHOD THEREOF

(71) Applicant: BROADWAY SYSTEM, INC., Taipei City (TW)

(72) Inventor: Tai Lung Liu, Taipei City (TW)

(73) Assignee: BROADWAY SYSTEM, INC., Taipei City (TW)

( * ) Notice: Subject to any disclaimer, the term of this patent is extended or adjusted under 35 U.S.C. 154(b) by 0 days.

(21) Appl. No.: 18/900,937

(22) Filed: Sep. 30, 2024

(65) Prior Publication Data

US 2025/0202741 A1 Jun. 19, 2025

Related U.S. Application Data

(60) Provisional application No. 63/612,302, filed on Dec. 19, 2023.

(30) Foreign Application Priority Data

Jul. 23, 2024 (TW) .................................. 113127501

(51) Int. Cl.
*H04L 25/03* (2006.01)
(52) U.S. Cl.
CPC .. *H04L 25/03878* (2013.01); *H04L 25/03248* (2013.01); *H04L 25/03987* (2013.01)
(58) Field of Classification Search
CPC ......... H04L 25/03878; H04L 25/03248; H04L 25/03987
USPC ........................................................ 375/262
See application file for complete search history.

(56) References Cited

U.S. PATENT DOCUMENTS

2013/0142244 A1 6/2013 Tan
2020/0287334 A1* 9/2020 Kulkarni ................ H01R 13/64
2023/0367728 A1* 11/2023 Nie ...................... G06F 13/4265

FOREIGN PATENT DOCUMENTS

TW M662445 11/2024

OTHER PUBLICATIONS

"Office Action of Taiwan Counterpart Application", issued on May 9, 2025, p. 1-p. 9.

* cited by examiner

*Primary Examiner* — Leila Malek
(74) *Attorney, Agent, or Firm* — JCIPRNET

(57) ABSTRACT

Disclosed is a redriver and an operation method thereof. The redriver includes an equalizer, an auxiliary channel detector, and a control circuit. The equalizer improves the signal quality of a main channel of a signal transmission system. The auxiliary channel detector detects level toggling of an auxiliary channel of the signal transmission system. When an auxiliary channel detection result indicates that the auxiliary channel is at an unconnected level, the control circuit controls the equalizer to enter a disconnection phase to save power. When the auxiliary channel detection result indicates that the auxiliary channel changes from the unconnected level to a connected level, and a command form toggling event occurs, the control circuit controls the equalizer to enter a connected phase from the disconnection phase. The equalizer is turned on in the connected phase.

23 Claims, 7 Drawing Sheets

REDRIVER AND OPERATION METHOD THEREOF

CROSS-REFERENCE TO RELATED APPLICATION

This application claims the priority benefit of U.S. provisional application Ser. No. 63/612,302, filed on Dec. 19, 2023 and Taiwan application serial no. 113127501, filed on Jul. 23, 2024. The entirety of each of the above-mentioned patent application is hereby incorporated by reference herein and made a part of this specification.

BACKGROUND

Technical Field

The disclosure relates to a signal transmission system, and in particular to a redriver and an operation method thereof.

Description of Related Art

When a high-speed signal passes through a transmission path such as a cable or a printed circuit board, the signal attenuation is serious. Generally speaking, the longer the signal transmission distance, the more serious the signal attenuation (that is, the worse the signal quality), which leads to difficulty to recover the transmitted signal for a remote receiver. A retimer may be used as a repeater in the transmission path. The retimer may perform decoding of the transmission signal from a signal source device to obtain decoded data, and then re-encode the decoded data to generate a transmission signal with a good signal quality to a signal destination device. Therefore, many high-speed signal transmission system specifications use retimers to improve the signal quality of high-speed signal transmission systems. For example, based on the Universal Serial Bus (USB) specification, a retimer is used in a USB host, a USB cable, or a USB device to improve the signal quality of a RX2 channel, a TX2 channel, a TX1 channel, and a RX1 channel. However, how to reduce the cost of a repeater is one of many technical issues in the field.

SUMMARY

The disclosure provides a redriver and an operation method thereof to improve a signal quality of a main channel of a signal transmission system.

In an embodiment of the disclosure, the redriver includes multiple equalizers, at least one auxiliary channel detector, and a control circuit. The equalizers are configured to improve a signal quality of different main channels of the signal transmission system. The auxiliary channel detector is configured to detect level toggling of at least one auxiliary channel of the signal transmission system. The control circuit is coupled to the auxiliary channel detector to receive an auxiliary channel detection result. The control circuit is further coupled to the equalizers. In response to the auxiliary channel detection result indicating that the auxiliary channel is all at an unconnected level, the control circuit controls the equalizers to enter a disconnection phase. The equalizers are turned off in the disconnection phase to save power. In response to the auxiliary channel detection result indicating that the auxiliary channel changes from the unconnected level to a connected level, and a command form toggling event occurs in the auxiliary channel, the control circuit controls the equalizers to enter a connected phase from the disconnection phase. The equalizers are turned on in the connected phase.

In an embodiment of the disclosure, the operation method includes: detecting level toggling of at least one auxiliary channel of the signal transmission system by at least one auxiliary channel detector of the redriver; controlling the redriver to enter a power saving mode in response to the auxiliary channel detection result of the auxiliary channel detector indicating that the auxiliary channel is all at the unconnected level; and controlling the redriver to enter an operation mode in response to the auxiliary channel detection result indicating that the auxiliary channel changes from the unconnected level to the connected level, and the command form toggling event occurs in the auxiliary channel.

Based on the above, the auxiliary channel detector mentioned in the embodiments of the disclosure detects level toggling of the auxiliary channel of the signal transmission system. When the auxiliary channel changes from the unconnected level to the connected level (such as from a low level to a high level), and the command form toggling event occurs (such as frequent level toggling occurs), the equalizers enter the connected phase (turned on). The equalizers that are turned on may improve the signal quality of the main channel of the signal transmission system. When the auxiliary channel is at the unconnected level and reaches a threshold duration (such as maintaining at a low level), the equalizers enter the disconnection phase (turned off) to save power.

In order to make the features and advantages of the disclosure more comprehensible, the following examples are given and described in detail with the accompanying drawings as follows.

DESCRIPTION OF THE EMBODIMENTS

Figure 1:
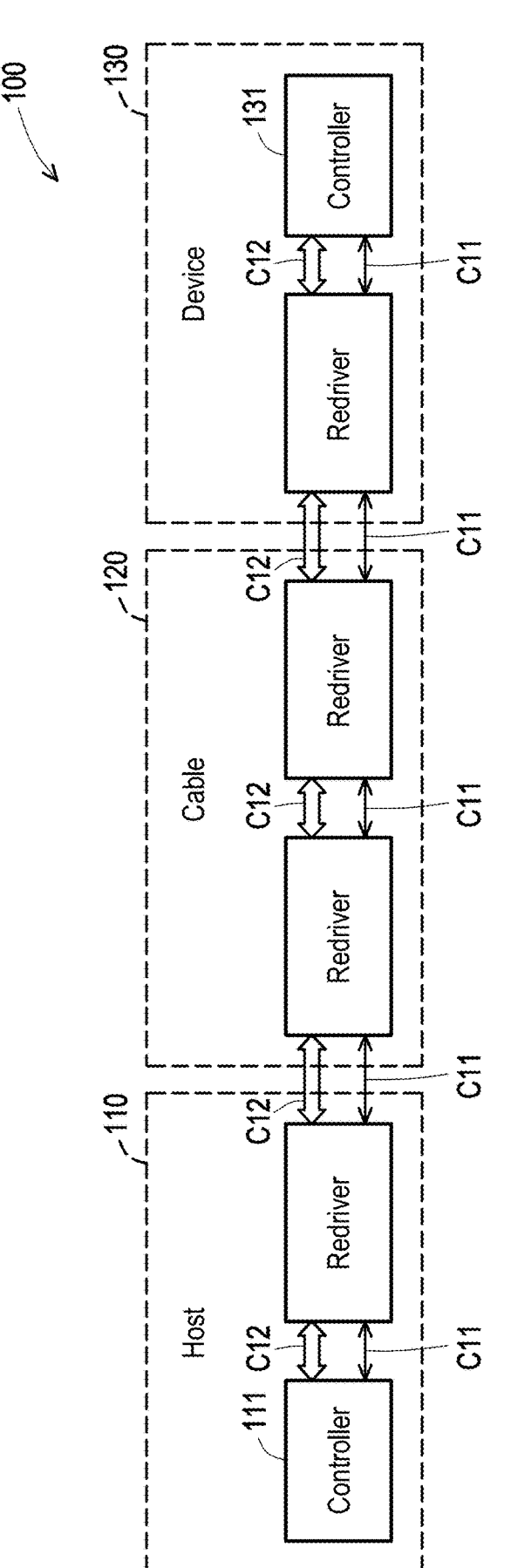
FIG. 1 is a circuit block diagram of a signal transmission system of the disclosure.

The word "coupling (or connection)" used throughout the specification of the disclosure (including claims) may refer to any direct or indirect means of connection. For example, if the disclosure describes that a first device is coupled (or connected) to a second device, it should be interpreted as that the first device may be directly connected to the second device, or that the first device may be indirectly connected to the second device through other devices or some means of connection. The terms "first" and "second" mentioned throughout the specification of the disclosure (including claims) are used to name elements, or to distinguish different embodiments or scopes, and are not used to restrict the upper limit or lower limit of the number of elements, and are not used to restrict the order of elements either. In addition, wherever possible, elements/components/steps with the same reference numerals are used in drawings and embodiments to represent the same or similar parts. Elements/ components/steps with the same reference numerals or with the same terms in different embodiments may be cross-referenced with relevant descriptions.

FIG. 1 is a circuit block diagram of a signal transmission system of the disclosure. A signal transmission system 100 of FIG. 1 includes a host 110, a cable 120, and a device 130. The cable 120 is connected between the host 110 and the device 130. The host 110 and the device 130 communicate with each other through the cable 120. For example, the host 110 and the device 130 negotiate system configuration with each other through an auxiliary channel C11. Then, the host 110 and the device 130 transmit a data signal to each other through a main channel C12. The main channel C12 is, for example, a main transmission channel. The signal transmission system 100 of the disclosure may be a USB3, USB4, Thunderbolt, DisplayPort, HDMI, PCIe transmission system or another high-speed signal transmission system. Taking the USB4 transmission system as an example, the host 110 is a USB host, the cable 120 is a USB cable, the device 130 is a USB device, the auxiliary channel C11 includes side-band channels (such as SBTX and SBRX) that are compatible with the USB4 specification, and the main channel C12 includes RX2, TX2, TX1 and RX1 channels that are compatible with the USB4 specification.

In the embodiment, a redriver is used in a transmission path between a controller 111 of the host 110 and a controller 131 of the device 130 as a repeater in the signal transmission system 100. Unlike a retimer, the redriver does not have the ability to decode a transmission signal from the controller 111 and does not know the operation negotiation content between the controller 111 and the controller 131. FIG. 1 illustrates four disposal positions of the redriver in the signal transmission system 100. The disposal position and quantity of the redriver may be decided according to an actual design. The redriver may regenerate a signal to improve the high-speed signal quality of the signal transmission system 100. For example, the redriver may be used in a USB host, a USB cable or a USB device to improve the signal quality of the RX2, TX2, TX1 and RX1 channels.

Figure 2:
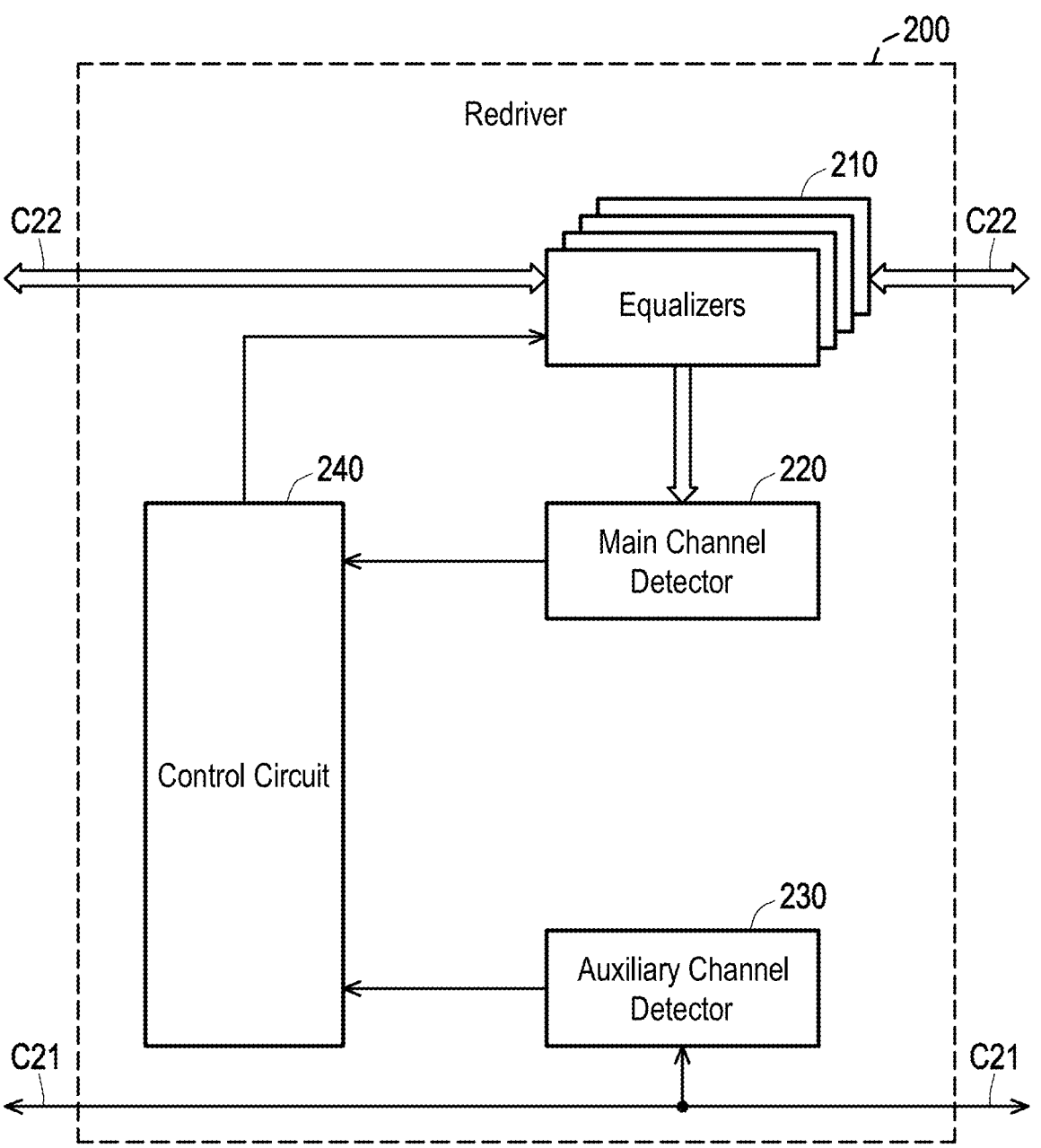
FIG. 2 is a circuit block diagram of a redriver according to an embodiment of the disclosure.

FIG. 2 is a circuit block diagram of a redriver according to an embodiment of the disclosure. A redriver 200 shown in FIG. 2 may be used as one of many embodiments of any redriver shown in FIG. 1. The redriver 200 is, for example, a high-speed signal redriver that includes multiple equalizers 210, at least one main channel detector 220, at least one auxiliary channel detector 230, and a control circuit 240. According to different designs, an implementation of the control circuit 240 may be a hardware circuit or a combined form of hardware, firmware and software (that is, program).

In terms of the hardware form, the control circuit 240 may be implemented as a logic circuit on an integrated circuit. For example, relevant functions of the control circuit 240 may be implemented in at least one hardware controller, microcontroller, hardware processor, microprocessor, application-specific integrated circuit (ASIC), digital signal processor (DSP), field programmable gate array (FPGA), central processing unit (CPU), and/or various logic blocks, modules and circuits in other processing units. The relevant functions of the control circuit 240 may be implemented as the hardware circuit, such as various logic blocks, modules and circuits in integrated circuits, by using a hardware description language (such as Verilog HDL or VHDL) or other suitable programming languages.

In terms of the software form and/or the firmware form, the relevant functions of the control circuit 240 may be implemented as programming codes. For example, a general programming language (such as C, C++, or assembly language) or other suitable programming languages is used to implement the control circuit 240. The programming codes may be recorded/stored in a "non-transitory machine-readable storage medium." In some embodiments, the non-transitory machine-readable storage medium, for example, includes, a semiconductor memory and/or a storage device. The storage device includes a hard disk drive (HDD), a solid-state drive (SSD), or other storage devices. An electronic device (such as CPU, hardware controller, microcontroller, hardware processor, or microprocessor) may read and execute the programming codes from the non-transitory machine-readable storage medium in order to implement the relevant functions of the control circuit 240.

As mentioned above, the control circuit 240 is coupled to the equalizers 210. The equalizers 210 are configured to individually improve the signal quality of different main channels C22 of the signal transmission system 100 (such as the main channel C12 shown in FIG. 1). The main channel detector 220 and the auxiliary channel detector 230 are toggle detectors. The auxiliary channel detector 230 is configured to detect level toggling of an auxiliary channel C21 of the signal transmission system 100 (such as the auxiliary channel C11 shown in FIG. 1). The control circuit 240 is coupled to the auxiliary channel detector 230 to receive an auxiliary channel detection result.

Figure 3:
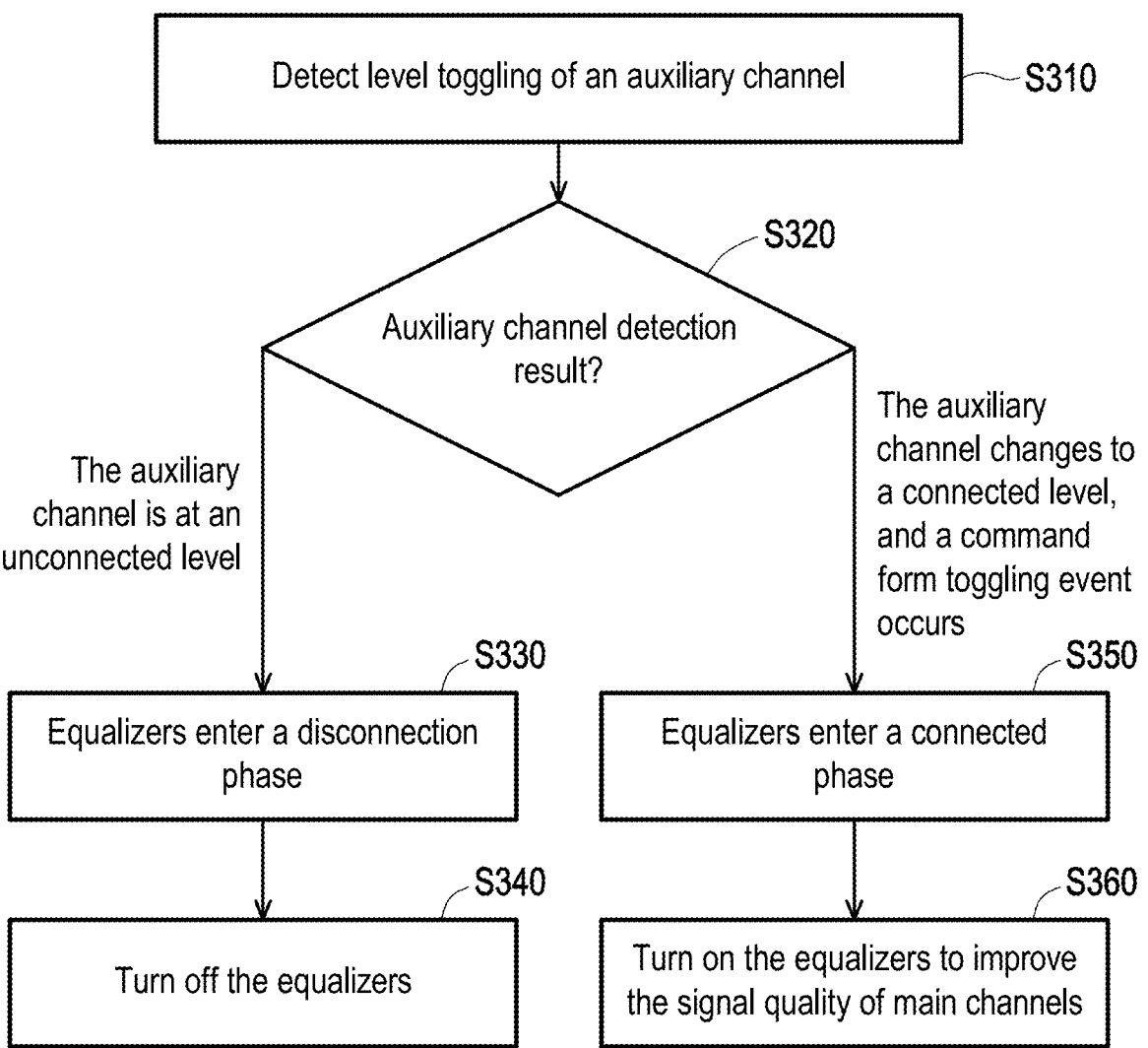
FIG. 3 is an operation flow chart of a redriver according to an embodiment of the disclosure.

An operation method of a redriver is described here. FIG. 3 is an operation flow chart of a redriver according to an embodiment of the disclosure. First, please refer to FIG. 1, FIG. 2, and FIG. 3. At least one auxiliary channel detector of a redriver detects level toggling of at least one auxiliary channel of a signal transmission system. That is, as Step S310, the auxiliary channel detector 230 detects level toggling of the auxiliary channel of the signal transmission system 100. When an auxiliary channel detection result of the auxiliary channel detector 230 indicates that the auxiliary channel of the signal transmission system 100 is all at an unconnected level and, for example, reaches a threshold duration (such as maintaining at a low level), that is, a determination result of Step S320 is that "the auxiliary channel is at the unconnected level," the control circuit 240 performs Step S330 to control the equalizers 210 to enter a disconnection phase. The equalizers 210 are turned off in the disconnection phase to save power (Step S340). In detail, in the disclosure, the auxiliary channel detection result in response to the at least one auxiliary channel detector indicates: the at least one auxiliary channel is all at the unconnected level, and the equalizers of the redriver may be controlled to enter the disconnection phase to be turned off to allow the redriver to enter a power saving mode.

When the auxiliary channel detection result indicates that the at least one auxiliary channel of the signal transmission system 100 changes from the unconnected level to a connected level (such as from a low level to a high level), and a command form toggling event occurs in the at least one auxiliary channel (such as a frequent level toggling occurs in an auxiliary channel), that is, the determination result of Step S320 is that "the auxiliary channel changes to the connected level, and the command form toggling event occurs," the redriver is controlled to enter an operation mode. The control circuit 240 performs Step S350 to control the equalizers 210 to enter a connected phase from the disconnection phase. The equalizers 210 are turned on in the connected phase to enter the operation mode. Therefore, the equalizers 210 may individually improve the signal quality of different main channels of the signal transmission system 100 (Step S360).

In summary, the auxiliary channel detector 230 detects level toggling of the auxiliary channel of the signal transmission system 100. When the auxiliary channel changes from the unconnected level to the connected level (such as from a low level to a high level), and the command form toggling event occurs (such as frequent level toggling occurs), the equalizers 210 enter the connected phase (turned on). The equalizers 210 that are turned on may improve the signal quality of the main channel of the signal transmission system 100. When the auxiliary channel is at the unconnected level and reaches the threshold duration (such as maintaining at a low level), the equalizers 210 enter the disconnection phase (turned off) to save power.

Figure 4:
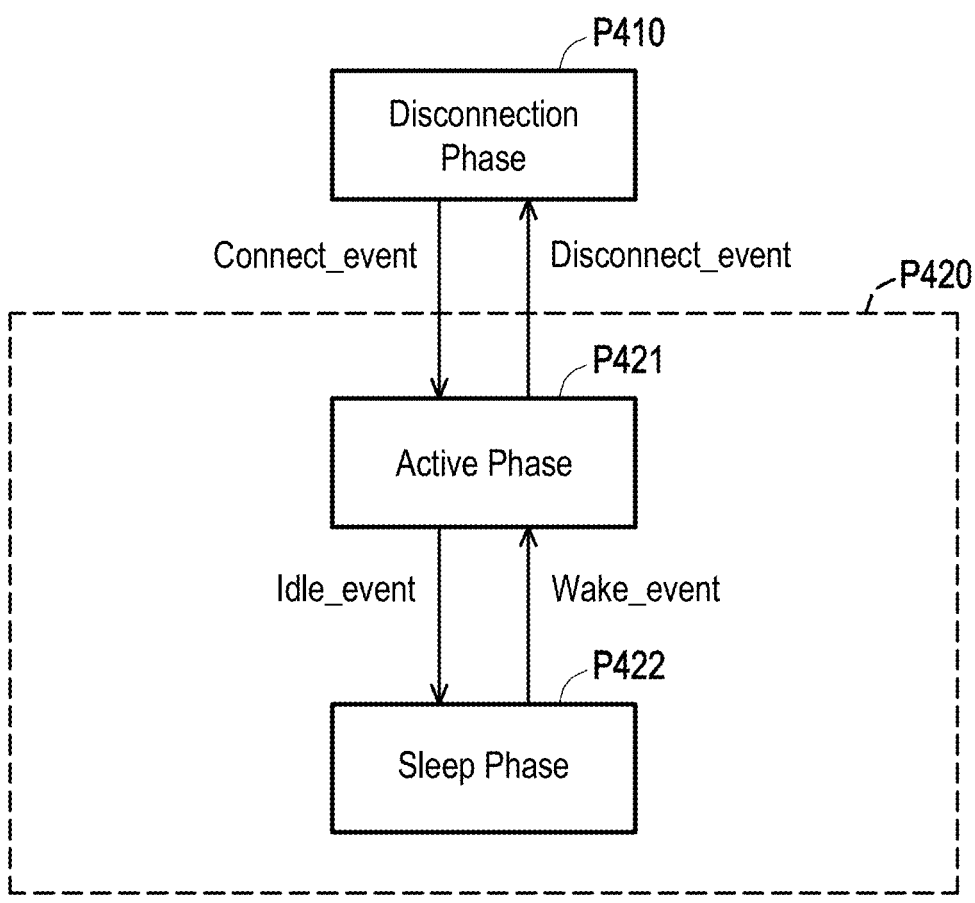
FIG. 4 is an operation phase schematic diagram of a redriver according to an embodiment of the disclosure.

FIG. 4 is an operation phase schematic diagram of a redriver according to an embodiment of the disclosure. Please refer to FIG. 2 and FIG. 4. When an auxiliary channel detection result indicates that an auxiliary channel is all at an unconnected level, the equalizers 210 are at a disconnection phase P410 (the equalizers 210 are turned off). When a connect event occurs, the equalizers 210 enter a connected phase P420 (the equalizers 210 are turned on) from the disconnection phase P410. Conditions for establishing the connect event, for example, include: an auxiliary channel changing from an unconnected level to a connected level (such as from a low level to a high level), and a command form toggling event occurring in the auxiliary channel (such as frequent level toggling occurs). The connected phase P420 includes an active phase P421 and a sleep phase P422. In response to the connect event being established, the control circuit 240 controls the equalizers 210 to enter the active phase P421 from the disconnection phase P410. In the active phase P421, the equalizers 210 are fully turned on to improve the signal quality of different main channels.

Please refer to FIG. 1, FIG. 2, and FIG. 4. Each main channel detector 220 individually detects level toggling of different main channels of the signal transmission system 100. The control circuit 240 is coupled to the main channel detector 220 to receive each main channel detection result. In response to an auxiliary channel detection result and a main channel detection result indicating that an idle event occurs in a certain target lane in a main channel, the control circuit 240 controls at least one corresponding equalizer that corresponds to the target lane in the equalizers 210 to enter the sleep phase P422 from the active phase P421. In the sleep phase P422, the at least one corresponding equalizer is fully turned off to save power. Conditions for establishing the idle event, for example, include: an auxiliary channel detection result indicating that an auxiliary channel is connected, and a main channel detection result indicating that the target lane already has no level toggling.

In response to an auxiliary channel detection result and a main channel detection result indicating that a wake event occurs, the control circuit 240 controls the equalizers 210 to all return to the active phase P421 from the sleep phase P422. Conditions for establishing the wake event, for example, include: an auxiliary channel detection result indicating that an auxiliary channel is connected, and a command form toggling event occurs in the auxiliary channel, or a main channel detection result indicating that level toggling appears in a target lane.

In response to an auxiliary channel detection result indicating that a disconnect event occurs, the control circuit 240 controls the equalizers 210 to all return to the disconnection phase P410 from the connected phase P420. Conditions for establishing the disconnect event, for example, include: an auxiliary channel changing from a connected level to an unconnected level and reaching a certain threshold duration. The threshold duration may be decided according to an actual design.

Figure 5:
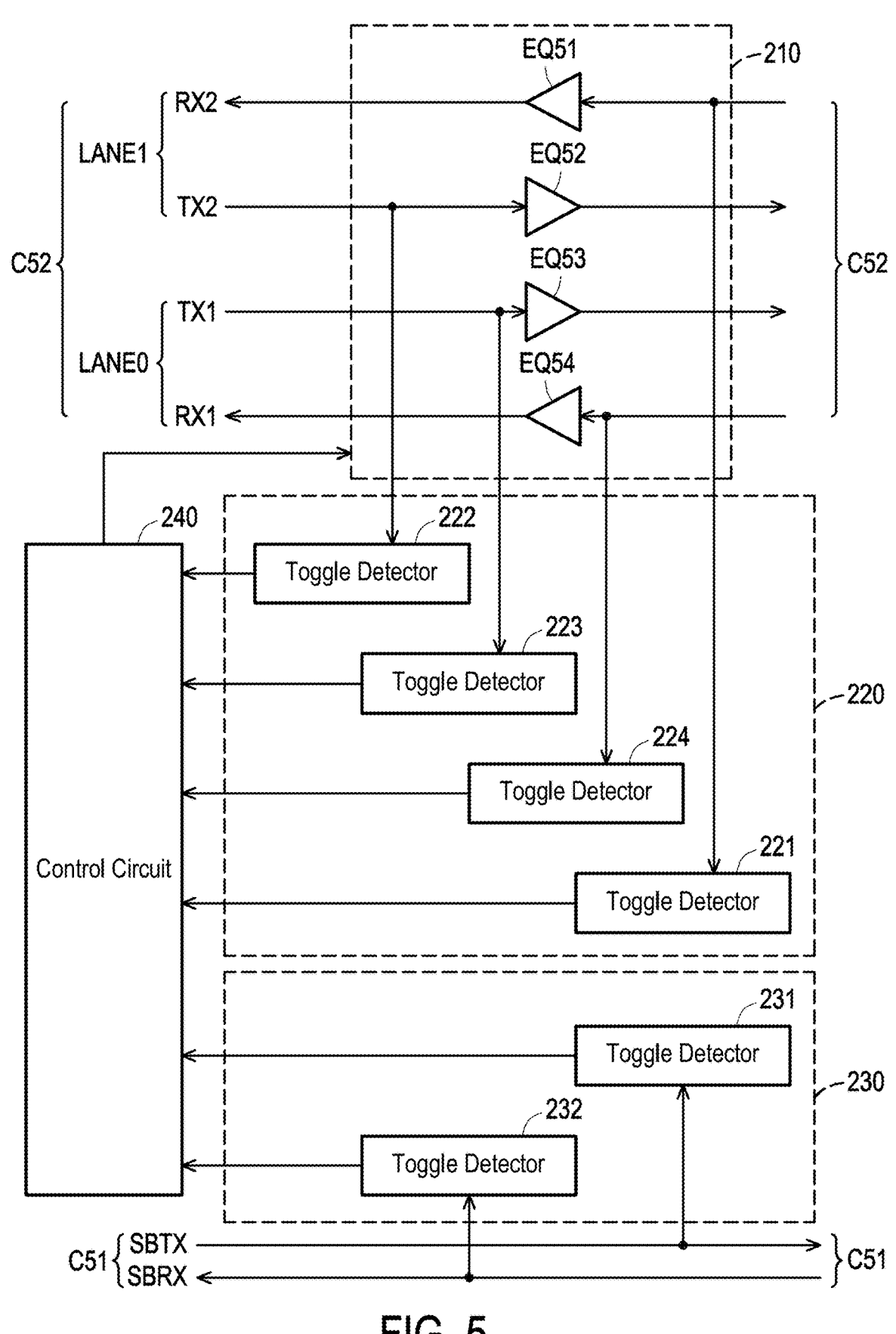
FIG. 5 is a circuit block schematic diagram of equalizers, a main channel detector and an auxiliary channel detector in a USB4 application scenario illustrated according to an embodiment of the disclosure.

FIG. 5 is a circuit block schematic diagram of equalizers, a main channel detector and an auxiliary channel detector in a USB4 application scenario illustrated according to an embodiment of the disclosure. The equalizers 210, the main channel detectors 220 and the auxiliary channel detectors 230 shown in FIG. 5 may be used as one of many implementation examples of the equalizers 210, the main channel detector 220 and the auxiliary channel detector 230 shown in FIG. 2. In an embodiment of FIG. 5, a main channel C52 of a signal transmission system (such as the main channel C12 shown in FIG. 1) includes the channels RX2, TX2, TX1 and RX1 that are compatible with the USB4 specification, and an auxiliary channel C51 of the signal transmission system (such as the auxiliary channel C11 shown in FIG. 1) includes sideband channels SBTX and SBRX that are compatible with the USB4 specification. The channels TX1 and RX1 form a lane LANE0, and the channels RX2 and TX2 form a lane LANE1. The equalizers 210 includes equalizers EQ51, EQ52, EQ53 and EQ54 that are configured to respectively improve the signal quality of the channels RX2, TX2, TX1 and RX1. The main channel detector 220 includes toggle detectors 221, 223 and 224 that are configured to respectively detect level toggling of the channels RX2, TX2, TX1 and RX1 and then provide a main channel detection result to the control circuit 240. The auxiliary channel detector 230 includes toggle detectors 231 and 232 that are configured to respectively detect level toggling of the sideband channels SBTX and SBRX and then provide an auxiliary channel detection result to the control circuit 240.

When auxiliary channel detection results of the toggle detectors 231-232 indicate that the sideband channels SBTX and SBRX are both maintained at a low level, the control circuit 240 turns off the equalizers EQ51, EQ52, EQ53 and EQ54 (the disconnection phase P410). When a connect event occurs, the control circuit 240 turns on the equalizers EQ51-EQ54 (entering the active phase P421 from the disconnection phase P410). When auxiliary channel detection results of the toggle detectors 231-232 and main channel detection results of the toggle detectors 221-224 indicate that an idle event occurs in a certain target lane (such as target lane LANE1), the control circuit 240 controls the equalizers EQ51-EQ52 that correspond to the target lane LANE1 to enter the sleep phase P422 from the active phase P421. At this time, assuming that no idle events have occurred in the target lane LANE0, the equalizers EQ53-EQ54 that correspond to the target lane LANE0 may maintain in the active phase P421. In the sleep phase P422, the corresponding equalizers EQ51-EQ52 are fully turned off to save power. When auxiliary channel detection results of the toggle detectors 231-232 and main channel detection results of the toggle detectors 221-224 indicate that a wake event occurs in any channel, the control circuit 240 controls the equalizers EQ51-EQ54 to all return to the active phase P421 from the sleep phase P422.

Figure 6:
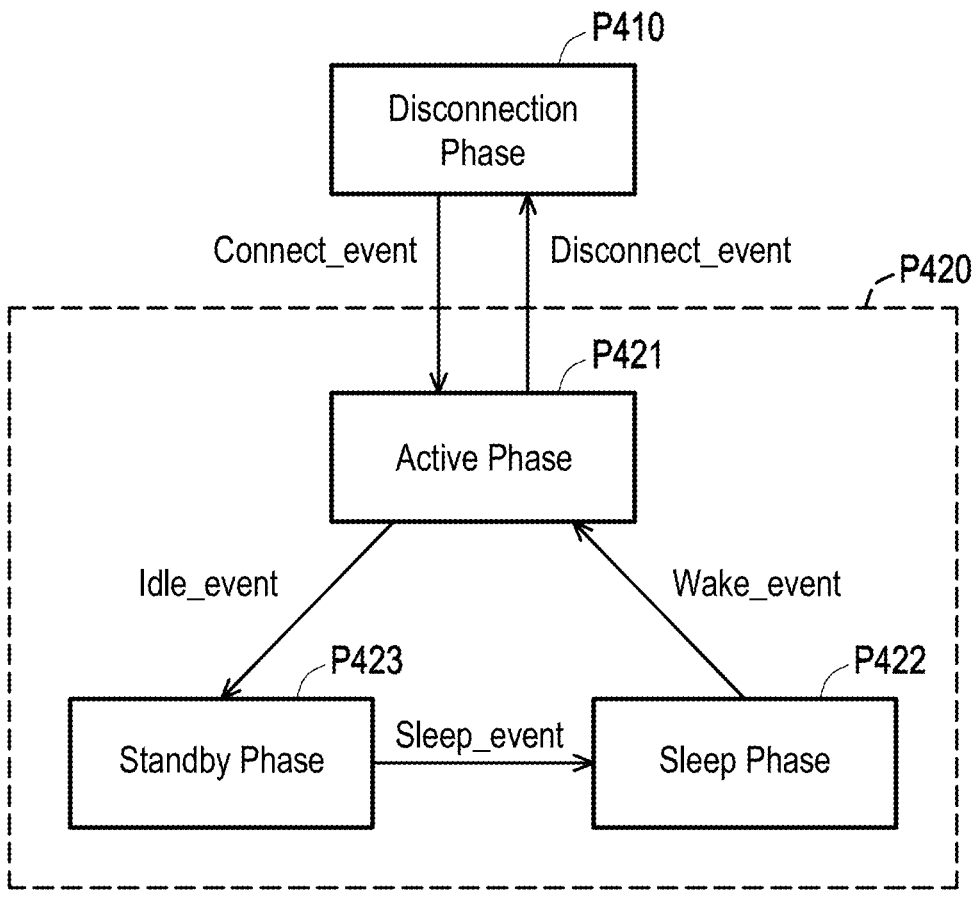
FIG. 6 is an operation phase schematic diagram of a redriver according to another embodiment of the disclosure.

FIG. 6 is an operation phase schematic diagram of a redriver according to another embodiment of the disclosure. The disconnection phase P410, a connect event, the connected phase P420 and a disconnection event shown in FIG. 6 may be correspondingly referred to the relevant descriptions of FIG. 4 and will not be described again. In an embodiment of FIG. 6, the connected phase P420 includes the active phase P421, a standby phase P423 and the sleep phase P422. The active phase P421, an idle event, the sleep phase P422 and a wake event shown in FIG. 6 may be correspondingly referred to the relevant descriptions of FIG. 4 and will not be described again.

Please refer to FIG. 2 and FIG. 6. In response to an auxiliary channel detection result and a main channel detection result indicating that an idle event occurs in a certain target lane in a main channel, the control circuit 240 controls at least one corresponding equalizer that corresponds to the target lane in the equalizers 210 to enter the standby phase P423 from the active phase P421. In the standby phase P423, the at least one corresponding equalizer is half-off to save power. In response to an auxiliary channel detection result and a main channel detection result indicating that a sleep event occurs in the target lane in the main channel, the control circuit 240 controls the at least one corresponding equalizer that corresponds to the target lane in the equalizers 210 to enter the sleep phase P422 from the standby phase P423. In the sleep phase P422, the at least one corresponding equalizer is fully turned off to further save power. Conditions for establishing the sleep event, for example, include: an auxiliary channel detection result indicating that the at least one auxiliary channel is connected, and a main channel detection result indicating that the target lane already has no level toggling and reaches a certain threshold duration. The threshold duration may be decided according to an actual design. In response to an auxiliary channel detection result and a main channel detection result indicating that a wake event occurs, the control circuit 240 controls the equalizers 210 to all return to the active phase P421 from the sleep phase P422.

Figure 7:
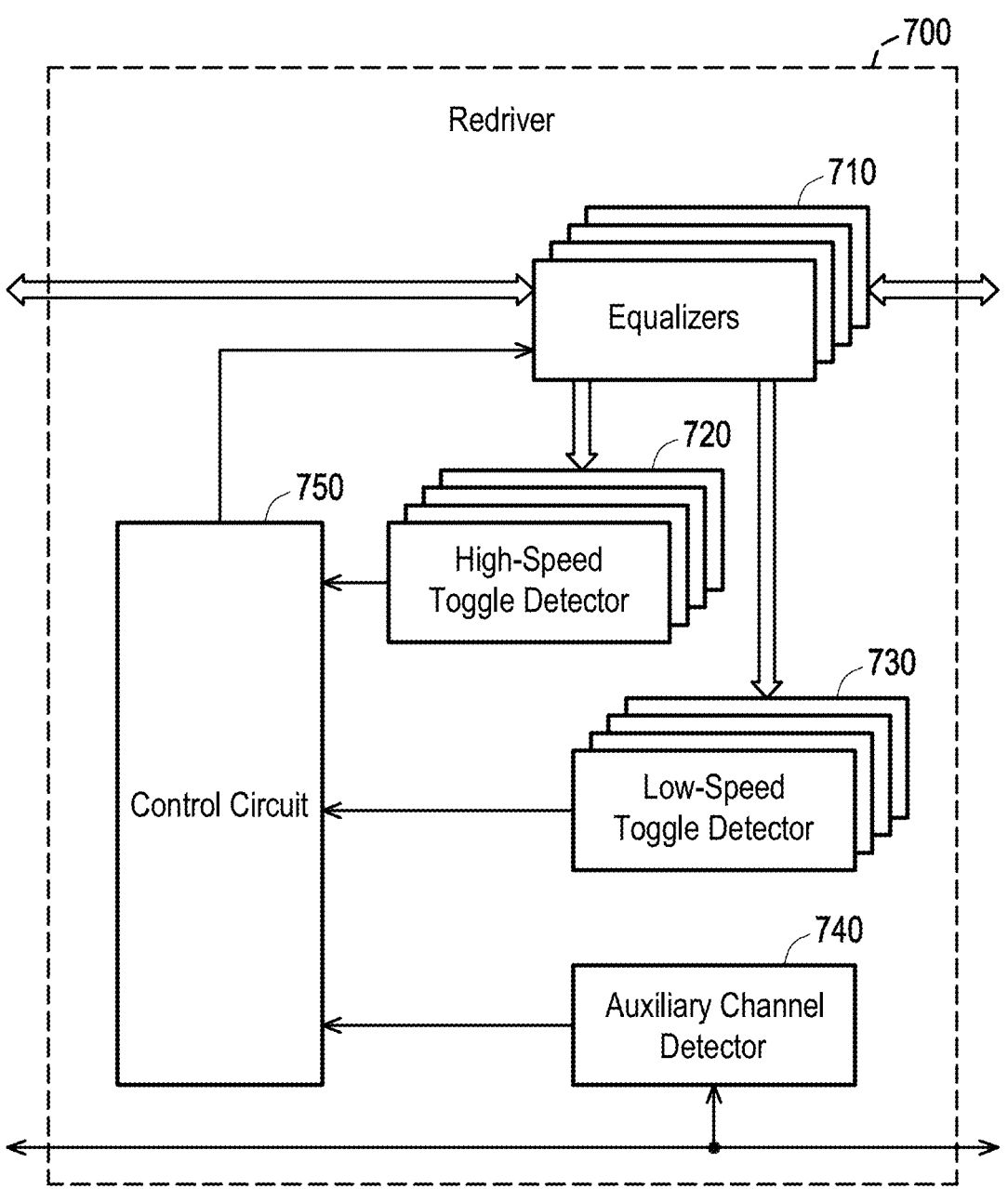
FIG. 7 is a circuit block diagram of a redriver according to another embodiment of the disclosure.

FIG. 7 is a circuit block diagram of a redriver according to another embodiment of the disclosure. A redriver 700 of FIG. 7 may be used as one of the embodiments of any redriver shown in FIG. 1 that includes multiple equalizers 710, multiple high-speed toggle detectors 720 that individually detect high-frequency toggling of different main channels (detecting a high-frequency component of a channel) of the signal transmission system 100, multiple low-speed toggle detectors 730 that individually detect low-frequency toggling of the different main channels (detecting a low-frequency element of a channel) of the signal transmission system 100, at least one auxiliary channel detector 740, and a control circuit 750 that is coupled to the equalizers 710. The control circuit 750 is coupled to the high-speed toggle detector 720 and the low-speed toggle detector 730, and receives multiple high-frequency and low-frequency toggle detection results of different main channels. The redriver 700 may also execute the operation method shown in FIG. 3. The equalizers 710, the auxiliary channel detector 740 and the control circuit 750 may be deduced by referring to the relevant descriptions of the corresponding components shown in FIG. 2 and will not be described again. The equalizers 710 and the auxiliary channel detector 740 shown in FIG. 7 may also be referred to the relevant descriptions of the corresponding components shown in FIG. 5. The high/low-speed toggle detectors 720/730 may be referred to the relevant descriptions of the main channel detector 220 of FIG. 5 and will not be described again.

In summary, the auxiliary channel detector 740 detects level toggling of an auxiliary channel of the signal transmission system 100. When the auxiliary channel changes from an unconnected level to a connected level (such as from a low level to a high level) and a command form toggling event occurs (such as a frequent level toggling occurs), the equalizers 710 enter a connected phase (turned on). The equalizers 710 that are turned on may improve the signal quality of a main channel of the signal transmission system 100. When the auxiliary channel is at the unconnected level and reaches a threshold duration (such as maintaining at a low level), the equalizers 710 enter a disconnection phase (turned off) to save power.

Please refer to FIG. 4 and FIG. 7. When an auxiliary channel detection result of the auxiliary channel detector 740 indicates that a connect event occurs, that is, in response to an auxiliary channel changing from an unconnected level to a connected level, and a command form toggling event occurring in the auxiliary channel, the control circuit 750 controls the equalizers 710 to enter the active phase P421 from the disconnection phase P410. In the active phase P421, the equalizers 710 are fully turned on to improve the signal quality of different main channels. In response to the foregoing auxiliary channel detection result and the high/low-frequency toggle detection results indicating that an idle event occurs in a certain target lane in the different main channels, the control circuit 750 controls at least one corresponding equalizer that corresponds to the target lane in the equalizers 710 to enter the sleep phase P422 from the active phase P421 to allow the at least one corresponding equalizer to be fully turned off to save power. Conditions for establishing the idle event, for example, include: an auxiliary channel detection result indicating that an auxiliary channel is connected, and high/low-frequency toggle detection results indicating that a target lane already has no high/low-frequency toggling.

In response to the foregoing auxiliary channel detection result and the high/low-frequency toggle detection results indicating that a wake event occurs, the control circuit 750 controls the equalizers 710 to all return to the active phase P421 from the sleep phase P422. Conditions for establishing the wake event, for example, include: an auxiliary channel detection result indicating that an auxiliary channel is connected, and a command form toggling event occurs; or high-frequency toggle detection results indicating that high-frequency toggling appears in a target lane; or low-frequency toggle detection results indicating that low-frequency toggling appears in a target lane.

Please refer to FIG. 6 and FIG. 7. When an auxiliary channel detection result of the auxiliary channel detector 740 indicates that a connect event occurs, that is, in response to an auxiliary channel changing from an unconnected level to a connected level and a command form toggling event occurs in the auxiliary channel, the control circuit 750 controls the equalizers 710 to enter the active phase P421 from the disconnection phase P410. In response to an auxiliary channel detection result and high/low-frequency toggle detection results of the foregoing auxiliary channel detector 740 indicating that an idle event occurs in a certain target lane in the different main channels, the control circuit 750 controls at least one corresponding equalizer that corresponds to the target lane in the equalizers 710 to enter the standby phase P423 from the active phase P421 to allow the corresponding equalizer to be half-off to save power. Conditions for establishing the idle event, for example, include: an auxiliary channel detection result indicating that an auxiliary channel is connected, and high/low-frequency toggle detection results indicating that a target lane already has no high/low-frequency toggling.

In response to the auxiliary channel detection result and the high/low-frequency toggle detection results indicating that a sleep event occurs in the target lane, the control circuit 750 controls the at least one corresponding equalizer that corresponds to the target lane to enter the sleep phase P422 from the standby phase P423 to allow the at least one corresponding equalizer to be fully turned off to further save power. Conditions for establishing the sleep event, for example, include: an auxiliary channel detection result indicating that the at least one auxiliary channel is connected, and high-frequency toggle detection results indicating that a target lane already has no high-frequency toggling and reaches a first threshold duration, and low-frequency toggle detection results indicating that a target lane already has no low-frequency toggling and reaches a second threshold duration. The first/second threshold duration may be decided according to an actual design.

In response to the auxiliary channel detection result and the high/low-frequency toggle detection results indicating that a wake event occurs, the control circuit 750 controls the equalizers 710 to all return to the active phase P421. Conditions for establishing the wake event, for example, include: an auxiliary channel detection result indicating that an auxiliary channel is connected, and a command form toggling event occurs; or high-frequency toggle detection results indicating that high-frequency toggling appears in a target lane; or low-frequency toggle detection results indicating that low-frequency toggling appears in a target lane.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A redriver comprising:
a plurality of equalizers configured to improve a signal quality of different main channels of a signal transmission system;
at least one auxiliary channel detector configured to detect level toggling of at least one auxiliary channel of the signal transmission system; and
a control circuit coupled to the at least one auxiliary channel detector to receive an auxiliary channel detection result, and coupled to the equalizers, wherein,
in response to the auxiliary channel detection result indicating that the at least one auxiliary channel is all at an unconnected level, the control circuit controls the equalizers to enter a disconnection phase, wherein the equalizers are turned off in the disconnection phase to save power;
in response to the auxiliary channel detection result indicating that the at least one auxiliary channel changes from the unconnected level to a connected level, and a command form toggling event occurs in the at least one auxiliary channel, the control circuit controls the equalizers to enter a connected phase from the disconnection phase, wherein the equalizers are turned on in the connected phase; and
in response to the auxiliary channel detection result indicating that the at least one auxiliary channel changes from the connected level to the unconnected level and reaches a first threshold duration, the control circuit controls the equalizers to return to the disconnection phase from the connected phase.

2. The redriver according to claim 1, wherein the signal transmission system comprises a Universal Serial Bus 3.0 (USB3), Universal Serial Bus 4 (USB4), Thunderbolt, DisplayPort, High-Definition Multimedia Interface (HDMI), or Peripheral Component Interconnect Express (PCIe) transmission system, and the at least one auxiliary channel comprises a sideband channel that is compatible with a USB4 specification, and the different main channels comprise channels receiver 2 (RX2), transmitter 2 (TX2), transmitter 1 (TX1) and receiver 1 (RX1) that are compatible with the USB4 specification.

3. The redriver according to claim 1, wherein the connected phase comprises an active phase and a sleep phase, and the redriver further comprises:
a plurality of main channel detectors configured to detect level toggling of the different main channels of the signal transmission system, wherein,
the control circuit is coupled to the main channel detectors to receive a plurality of main channel detection results;
in response to the auxiliary channel detection result indicating that the at least one auxiliary channel changes from the unconnected level to the connected level, and the command form toggling event occurs in the at least one auxiliary channel, the control circuit controls the equalizers to enter the active phase from the disconnection phase, wherein the equalizers are fully turned on in the active phase to improve the signal quality of the different main channels;
in response to the auxiliary channel detection result and the main channel detection results indicating that an idle event occurs in a target lane among the different main channels, the control circuit controls at least one corresponding equalizer that corresponds to the target lane in the equalizers to enter the sleep phase from the active phase, wherein the at least one corresponding equalizer is fully turned off in the sleep phase to save power; and
in response to the auxiliary channel detection result and the main channel detection results indicating that a wake event occurs, the control circuit controls the equalizers to all return to the active phase.

4. The redriver according to claim 3, wherein conditions for establishing the idle event comprise:
the auxiliary channel detection result indicating that the at least one auxiliary channel is connected; and
the main channel detection results indicating that the target lane already has no level toggling.

5. The redriver according to claim 3, wherein conditions for establishing the wake event comprise:
the auxiliary channel detection result indicating that the at least one auxiliary channel is connected, and the command form toggling event occurs in the at least one auxiliary channel; or
the main channel detection results indicating that level toggling appears in the target lane.

6. The redriver according to claim 1, wherein the connected phase comprises an active phase and a sleep phase, and the redriver further comprises a plurality of high-speed toggle detectors configured to detect high-frequency toggling of the different main channels of the signal transmission system and a plurality of low-speed toggle detectors configured to detect low-frequency toggling of the different main channels of the signal transmission system, wherein the control circuit is coupled to the high-speed toggle detectors to receive a plurality of high-frequency toggle detection results, and the control circuit is coupled to the low-speed toggle detectors to receive a plurality of low-frequency toggle detection results;
in response to the auxiliary channel detection result indicating that the at least one auxiliary channel changes from the unconnected level to the connected level, and the command form toggling event occurs in the at least one auxiliary channel, the control circuit controls the equalizers to enter the active phase from the disconnection phase, wherein the equalizers are fully turned on in the active phase to improve the signal quality of the different main channels;

in response to the auxiliary channel detection result, the high-frequency toggle detection results and the low-frequency toggle detection results indicating that an idle event occurs in a target lane among the different main channels, the control circuit controls at least one corresponding equalizer that corresponds to the target lane in the equalizers to enter the sleep phase from the active phase, wherein the at least one corresponding equalizer is fully turned off in the sleep phase to save power; and in response to the auxiliary channel detection result, the high-frequency toggle detection results and the low-frequency toggle detection results indicating that a wake event occurs, the control circuit controls the equalizers to all return to the active phase.

7. The redriver according to claim 6, wherein conditions for establishing the idle event comprise: the auxiliary channel detection result indicating that the at least one auxiliary channel is connected, and the high-frequency toggle detection results indicating that the target lane already has no high-frequency toggling, and the low-frequency toggle detection results indicating that the target lane already has no low-frequency toggling; and conditions for establishing the wake event comprise: the auxiliary channel detection result indicating that the at least one auxiliary channel is connected, and the command form toggling event occurs in the at least one auxiliary channel; or the high-frequency toggle detection results indicating that high-frequency toggling appears in the target lane; or the low-frequency toggle detection results indicating that low-frequency toggling appears in the target lane.

8. The redriver according to claim 1, wherein the connected phase comprises an active phase, a standby phase and a sleep phase, the redriver further comprises a plurality of main channel detectors configured to detect level toggling of the different main channels of the signal transmission system, the control circuit is coupled to the main channel detectors to receive a plurality of main channel detection results;

in response to the auxiliary channel detection result indicating that the at least one auxiliary channel changes from the unconnected level to the connected level, and the command form toggling event occurs in the at least one auxiliary channel, the control circuit controls the equalizers to enter the active phase from the disconnection phase, wherein the equalizers are fully turned on in the active phase to improve the signal quality of the different main channels;

in response to the auxiliary channel detection result and the main channel detection results indicating that an idle event occurs in a target lane among the different main channels, the control circuit controls at least one corresponding equalizer that corresponds to the target lane in the equalizers to enter the standby phase from the active phase, wherein the at least one corresponding equalizer is half-off in the standby phase to save power;

in response to the auxiliary channel detection result and the main channel detection results indicating that a sleep event occurs in the target lane among the different main channels, the control circuit controls the at least one corresponding equalizer that corresponds to the target lane in the equalizers to enter the sleep phase from the standby phase, wherein the at least one corresponding equalizer is fully turned off in the sleep phase to further save power; and in response to the auxiliary channel detection result and the main channel detection results indicating that a wake event occurs, the control circuit controls the equalizers to all return to the active phase.

9. The redriver according to claim 8, wherein conditions for establishing the idle event comprise: the auxiliary channel detection result indicating that the at least one auxiliary channel is connected, and the main channel detection results indicating that the target lane already has no level toggling;

conditions for establishing the sleep event comprise: the auxiliary channel detection result indicating that the at least one auxiliary channel is connected, and the main channel detection results indicating that the target lane already has no level toggling and reaches a second threshold duration; and conditions for establishing the wake event comprise: the auxiliary channel detection result indicating that the at least one auxiliary channel is connected, and the command form toggling event occurs in the at least one auxiliary channel; or the main channel detection results indicating that level toggling appears in the target lane.

10. The redriver according to claim 1, wherein the connected phase comprises an active phase, a standby phase and a sleep phase, the redriver further comprises a plurality of high-speed toggle detectors configured to detect high-frequency toggling of the different main channels of the signal transmission system and a plurality of low-speed toggle detectors configured to detect low-frequency toggling of the different main channels of the signal transmission system, the control circuit is coupled to the high-speed toggle detectors to receive a plurality of high-frequency toggle detection results, the control circuit is coupled to the low-speed toggle detectors to receive a plurality of low-frequency toggle detection results;

in response to the auxiliary channel detection result indicating that the at least one auxiliary channel changes from the unconnected level to the connected level, and the command form toggling event occurs in the at least one auxiliary channel, the control circuit controls the equalizers to enter the active phase from the disconnection phase, wherein the equalizers are fully turned on in the active phase to improve the signal quality of the different main channels;

in response to the auxiliary channel detection result, the high-frequency toggle detection results and the low-frequency toggle detection results indicating that an idle event occurs in a target lane among the different main channels, the control circuit controls at least one corresponding equalizer that corresponds to the target lane in the equalizers to enter the standby phase from the active phase, wherein the at least one corresponding equalizer is half-off in the standby phase to save power;

in response to the auxiliary channel detection result, the high-frequency toggle detection results and the low-frequency toggle detection results indicating that a sleep event occurs in the target lane among the different main channels, the control circuit controls the at least one corresponding equalizer that corresponds to the target lane in the equalizers to enter the sleep phase from the standby phase, wherein the at least one corresponding equalizer is fully turned off in the sleep phase to further save power; and in response to the auxiliary channel detection result, the high-frequency toggle detection results and the low-frequency toggle detection results indicating that a wake event occurs, the control circuit controls the equalizers to all return to the active phase.

11. The redriver according to claim 10, wherein conditions for establishing the idle event comprise: the auxiliary channel detection result indicating that the at least one auxiliary channel is connected, and the high-frequency toggle detection results indicating that the target lane already has no high-frequency toggling, and the low-frequency toggle detection results indicating that the target lane already has no low-frequency toggling;

conditions for establishing the sleep event comprise: the auxiliary channel detection result indicating that the at least one auxiliary channel is connected, and the high-frequency toggle detection results indicating that the target lane already has no high-frequency toggling and reaches a third threshold duration, and the low-frequency toggle detection results indicating that the target lane already has no low-frequency toggling and reaches a fourth threshold duration; and conditions for establishing the wake event comprise: the auxiliary channel detection result indicating that the at least one auxiliary channel is connected, and the command form toggling event occurs in the at least one auxiliary channel; or the high-frequency toggle detection results indicating that high-frequency toggling appears in the target lane; or the low-frequency toggle detection results indicating that low-frequency toggling appears in the target lane.

12. An operation method of a redriver having a plurality of equalizers, the equalizers respectively configured to improve a signal quality of different main channels of a signal transmission system, wherein the operation method comprises:

detecting level toggling of at least one auxiliary channel of the signal transmission system by at least one auxiliary channel detector of the redriver;

controlling the redriver to enter a power saving mode in response to an auxiliary channel detection result of the at least one auxiliary channel detector indicating that the at least one auxiliary channel is all at an unconnected level;

controlling the redriver to enter an operation mode in response to the auxiliary channel detection result indicating that the at least one auxiliary channel changes from the unconnected level to a connected level, and a command form toggling event occurs in the at least one auxiliary channel; and controlling the equalizers to return to a disconnection phase from a connected phase in response to the auxiliary channel detection result indicating that the at least one auxiliary channel changes from the connected level to the unconnected level and reaches a first threshold duration.

13. The operation method according to claim 12, wherein the signal transmission system comprises a Universal Serial Bus 3.0 (USB3), Universal Serial Bus 4 (USB4), Thunderbolt, DisplayPort, High-Definition Multimedia Interface (HDMI) or Peripheral Component Interconnect Express (PCIe) transmission system, and the at least one auxiliary channel comprises a sideband channel that is compatible with a USB4 specification, and the different main channels comprise receiver 2 (RX2), transmitter 2 (TX2), transmitter 1 (TX1) and receiver 1 (RX1) channels that are compatible with the USB4 specification.

14. The operation method according to claim 12, further comprising:

controlling the equalizers of the redriver to enter the disconnection phase so as to enter the power saving mode in response to the auxiliary channel detection result indicating that the at least one auxiliary channel is all at the unconnected level, wherein the equalizers are turned off in the disconnection phase to save power; and controlling the equalizers of the redriver to enter the connected phase from the disconnection phase so as to enter the operation mode in response to the auxiliary channel detection result indicating that the at least one auxiliary channel changes from the unconnected level to the connected level, and the command form toggling event occurs in the at least one auxiliary channel, wherein the equalizers are turned on in the connected phase.

15. The operation method according to claim 14, wherein the connected phase comprises an active phase and a sleep phase, and the operation method further comprises:

detecting level toggling of the different main channels of the signal transmission system by a plurality of main channel detectors of the redriver;

controlling the equalizers to enter the active phase from the disconnection phase in response to the auxiliary channel detection result indicating that the at least one auxiliary channel changes from the unconnected level to the connected level, and the command form toggling event occurs in the at least one auxiliary channel, wherein the equalizers are fully turned on in the active phase to improve the signal quality of the different main channels;

controlling at least one corresponding equalizer that corresponds to a target lane among the different main channels in the equalizers to enter the sleep phase from the active phase in response to the auxiliary channel detection result and a plurality of main channel detection results of the main channel detectors indicating that an idle event occurs in the target lane, wherein the at least one corresponding equalizer is fully turned off in the sleep phase to save power; and controlling the equalizers to all return to the active phase in response to the auxiliary channel detection result and the main channel detection results indicating that a wake event occurs.

16. The operation method according to claim 15, wherein conditions for establishing the idle event comprise:

the auxiliary channel detection result indicating that the at least one auxiliary channel is connected; and the main channel detection results indicating that the target lane already has no level toggling.

17. The operation method according to claim 15, wherein conditions for establishing the wake event comprise:

the auxiliary channel detection result indicating that the at least one auxiliary channel is connected, and the command form toggling event occurs in the at least one auxiliary channel; or the main channel detection results indicating that level toggling appears in the target lane.

18. The operation method according to claim 14, wherein the connected phase comprises an active phase and a sleep phase, and the operation method further comprises:

detecting high-frequency toggling of the different main channels of the signal transmission system by a plurality of high-speed toggle detectors of the redriver;

detecting low-frequency toggling of the different main channels of the signal transmission system by a plurality of low-speed toggle detectors of the redriver;

controlling the equalizers to enter the active phase from the disconnection phase in response to the auxiliary channel detection result indicating that the at least one auxiliary channel changes from the unconnected level to the connected level, and the command form toggling event occurs in the at least one auxiliary channel, wherein the equalizers are fully turned on in the active phase to improve the signal quality of the different main channels;

controlling at least one corresponding equalizer that corresponds to a target lane among the different main channels in the equalizers to enter the sleep phase from the active phase in response to the auxiliary channel detection result, a plurality of high-frequency toggle detection results of the high-speed toggle detectors and a plurality of low-frequency toggle detection results of the low-speed toggle detectors indicating that an idle event occurs in the target lane, wherein the at least one corresponding equalizer is fully turned off in the sleep phase to save power; and controlling the equalizers to all return to the active phase in response to the auxiliary channel detection result, the high-frequency toggle detection results and the low-frequency toggle detection results indicating that a wake event occurs.

19. The operation method according to claim 18, wherein conditions for establishing the idle event comprise: the auxiliary channel detection result indicating that the at least one auxiliary channel is connected, and the high-frequency toggle detection results indicating that the target lane already has no high-frequency toggling, and the low-frequency toggle detection results indicating that the target lane already has no low-frequency toggling; and conditions for establishing the wake event comprise: the auxiliary channel detection result indicating that the at least one auxiliary channel is connected, and the command form toggling event occurs in the at least one auxiliary channel; or the high-frequency toggle detection results indicating that high-frequency toggling appears in the target lane;

or the low-frequency toggle detection results indicating that low-frequency toggling appears in the target lane.

20. The operation method according to claim 14, wherein the connected phase comprises an active phase, a standby phase and a sleep phase, and the operation method further comprises:

detecting level toggling of the different main channels of the signal transmission system by a plurality of main channel detectors of the redriver;

controlling the equalizers to enter the active phase from the disconnection phase in response to the auxiliary channel detection result indicating that the at least one auxiliary channel changes from the unconnected level to the connected level, and the command form toggling event occurs in the at least one auxiliary channel, wherein the equalizers are fully turned on in the active phase to improve the signal quality of the different main channels;

controlling at least one corresponding equalizer that corresponds to a target lane among the different main channels in the equalizers to enter the standby phase from the active phase in response to the auxiliary channel detection result and a plurality of main channel detection results of the main channel detectors indicating that an idle event occurs in the target lane, wherein the at least one corresponding equalizer is half-off in the standby phase to save power;

controlling the at least one corresponding equalizer that corresponds to the target lane in the equalizers to enter the sleep phase from the standby phase in response to the auxiliary channel detection result and the main channel detection results indicating that a sleep event occurs in the target lane among the different main channels, wherein the at least one corresponding equalizer is fully turned off in the sleep phase to further save power; and controlling the equalizers to all return to the active phase in response to the auxiliary channel detection result and the main channel detection results indicating that a wake event occurs.

21. The operation method according to claim 20, wherein conditions for establishing the idle event comprise: the auxiliary channel detection result indicating that the at least one auxiliary channel is connected, and the main channel detection results indicating that the target lane already has no level toggling;

conditions for establishing the sleep event comprise: the auxiliary channel detection result indicating that the at least one auxiliary channel is connected, and the main channel detection results indicating that the target lane already has no level toggling and reaches a second threshold duration; and conditions for establishing the wake event comprise: the auxiliary channel detection result indicating that the at least one auxiliary channel is connected, and the command form toggling event occurs in the at least one auxiliary channel; or the main channel detection results indicating that level toggling appears in the target lane.

22. The operation method according to claim 14, wherein the connected phase comprises an active phase, a standby phase and a sleep phase, and the operation method further comprises:

detecting high-frequency toggling of the different main channels of the signal transmission system by a plurality of high-speed toggle detectors of the redriver;

detecting low-frequency toggling of the different main channels of the signal transmission system by a plurality of low-speed toggle detectors of the redriver;

controlling the equalizers to enter the active phase from the disconnection phase in response to the auxiliary channel detection result indicating that the at least one auxiliary channel changes from the unconnected level to the connected level, and the command form toggling event occurs in the at least one auxiliary channel, wherein the equalizers are fully turned on in the active phase to improve the signal quality of the different main channels;

controlling at least one corresponding equalizer that corresponds to a target lane among the different main channels in the equalizers to enter the standby phase from the active phase in response to the auxiliary channel detection result, a plurality of high-frequency toggle detection results of the high-speed toggle detectors and a plurality of low-frequency toggle detection results of the low-speed toggle detectors indicating that an idle event occurs in the target lane, wherein the at least one corresponding equalizer is half-off in the standby phase to save power;

controlling the at least one corresponding equalizer that corresponds to the target lane in the equalizers to enter the sleep phase from the standby phase in response to the auxiliary channel detection result, the high-frequency toggle detection results and the low-frequency toggle detection results indicating that a sleep event occurs in the target lane among the different main channels, wherein the at least one corresponding equalizer is fully turned off in the sleep phase to further save power; and controlling the equalizers to all return to the active phase in response to the auxiliary channel detection result, the high-frequency toggle detection results and the low-frequency toggle detection results indicating that a wake event occurs.

23. The operation method according to claim 22, wherein conditions for establishing the idle event comprise: the auxiliary channel detection result indicating that the at least one auxiliary channel is connected, and the high-frequency toggle detection results indicating that the target lane already has no high-frequency toggling, and the low-frequency toggle detection results indicating that the target lane already has no low-frequency toggling;

conditions for establishing the sleep event comprise: the auxiliary channel detection result indicating that the at least one auxiliary channel is connected, and the high-frequency toggle detection results indicating that the target lane already has no high-frequency toggling and reaches a third threshold duration, and the low-frequency toggle detection results indicating that the target lane already has no low-frequency toggling and reaches a fourth threshold duration; and conditions for establishing the wake event comprise: the auxiliary channel detection result indicating that the at least one auxiliary channel is connected, and the command form toggling event occurs in the at least one auxiliary channel; or the high-frequency toggle detection results indicating that high-frequency toggling appears in the target lane; or the low-frequency toggle detection results indicating that low-frequency toggling appears in the target lane.

\* \* \* \* \*